United States Patent
Yang et al.

(10) Patent No.: US 9,199,335 B2
(45) Date of Patent: Dec. 1, 2015

(54) AUTOMATIC MARKING DEVICE

(75) Inventors: Ming-Lu Yang, New Taipei (TW); Zhong-Wei Yang, Shenzhen (CN)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 920 days.

(21) Appl. No.: 13/398,493

(22) Filed: Feb. 16, 2012

(65) Prior Publication Data

US 2013/0082431 A1    Apr. 4, 2013

(30) Foreign Application Priority Data

Sep. 30, 2011   (CN) .......................... 2011 1 0293063

(51) Int. Cl.
| | |
|---|---|
| *B23Q 3/00* | (2006.01) |
| *B23K 26/08* | (2014.01) |
| *B23Q 7/14* | (2006.01) |
| *B41J 2/44* | (2006.01) |
| *B41J 3/407* | (2006.01) |

(52) U.S. Cl.
CPC ............ *B23K 26/083* (2013.01); *B23Q 7/1431* (2013.01); *B41J 2/442* (2013.01); *B41J 3/407* (2013.01)

(58) Field of Classification Search
USPC ........................................................ 269/308
See application file for complete search history.

(56) References Cited

U.S. PATENT DOCUMENTS

| | | | |
|---|---|---|---|
| 771,825 A * | 10/1904 | Jordan | 29/244 |
| 7,013,543 B2 * | 3/2006 | Iwabuchi et al. | 29/27 C |
| 7,013,544 B2 * | 3/2006 | Yasuda et al. | 29/27 C |

FOREIGN PATENT DOCUMENTS

| | | |
|---|---|---|
| CN | 101127301 A | 2/2008 |
| JP | 2004-284600 A | 10/2004 |

\* cited by examiner

*Primary Examiner* — Lee D Wilson
*Assistant Examiner* — Alvin Grant
(74) *Attorney, Agent, or Firm* — Novak Druce Connolly Bove + Quigg LLP

(57) ABSTRACT

A marking device making a marking using laser beam, includes a supporting assembly, a marking mechanism, a carrying assembly, a driving assembly, and a plurality of loading members. The loading members carry workpieces for marking. The marking mechanism emits a laser beam to mark the workpiece. The carrying assembly includes a transmitting member slidably mounted on the supporting assembly, and a bearing member mounted on the supporting assembly opposite to the marking mechanism. The driving assembly is mounted on the supporting assembly. The loading members are placed on the transmitting member and the bearing member. The driving assembly is capable of driving the transmitting member to align with the bearing member in a straight line, and then driving the loading member on the transmitting member to move to the bearing member.

19 Claims, 7 Drawing Sheets

US 9,199,335 B2

AUTOMATIC MARKING DEVICE

BACKGROUND

1. Technical Field

The present disclosure relates to marking devices, particularly to a marking device capable of automatically carrying a plurality of workpieces.

2. Description of Related Art

Conventional marking devices do not have an automatic carrying mechanism. Operators need to carry each workpiece to a platform aligned with a marking mechanism of the marking device and then press a start button to start the marking mechanism. After a workpiece has been marked by the marking mechanism, operators need to take off the marked workpiece from the platform to a next process station and then put on another unmarked workpiece to be marked. This is a highly labor intensive process, and the marking efficiency is relatively low.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
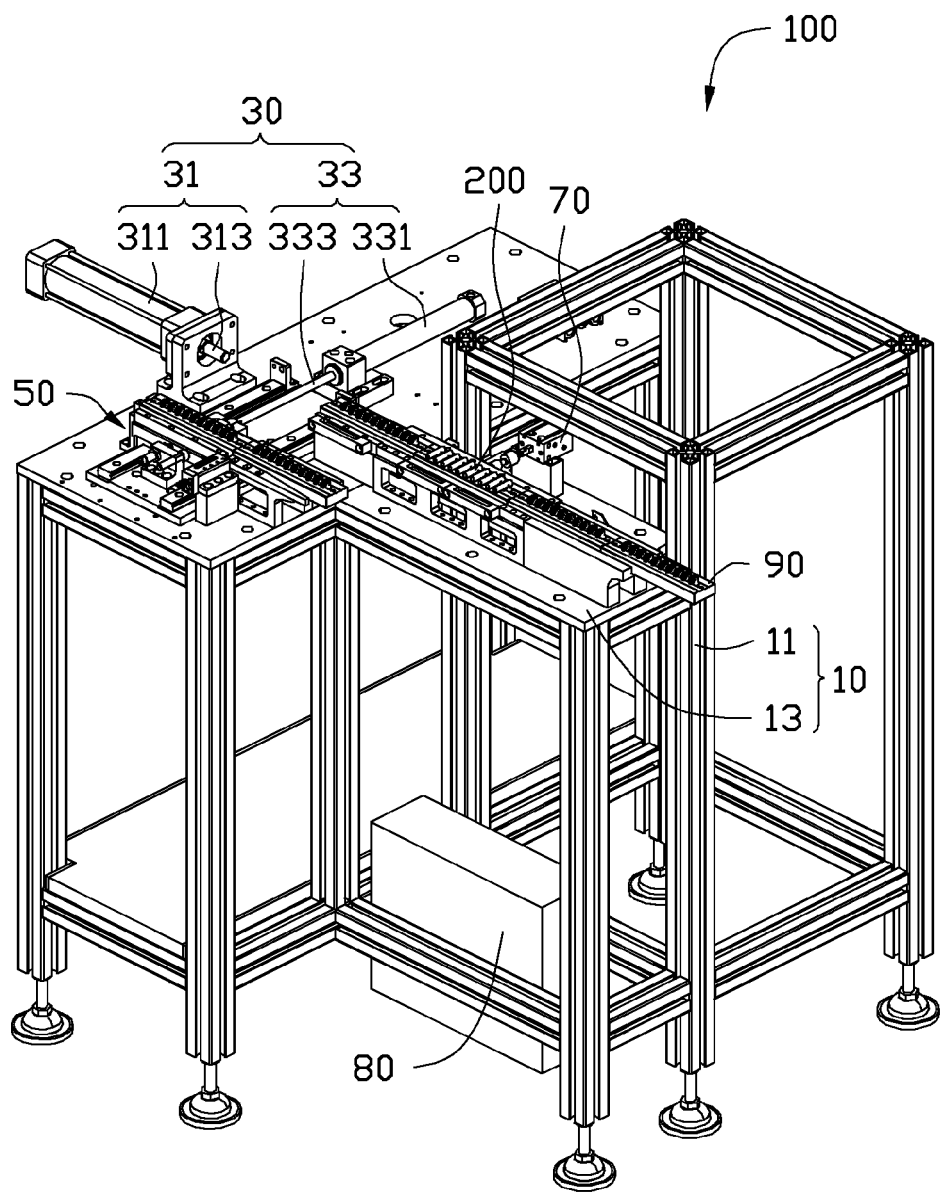
FIG. 1 is an isometric view of an embodiment of a marking device including a plurality of loading members, for marking a plurality of workpieces.

Referring to FIG. 1, an embodiment of a marking device 100 is used to make a marking on a plurality of workpieces 200. The marking device 100 includes a supporting assembly 10, a driving assembly 30, a carrying assembly 50, a positioning assembly 70, a marking mechanism 80, and a plurality of loading members 90. The driving assembly 30, the carrying assembly 50, and the positioning assembly 70 are mounted on the supporting assembly 10. The loading members 90 are movably placed on the carrying assembly 50, for loading the workpieces 200. The marking mechanism 80 is positioned under the carrying assembly 50, and aligned with one of the loading members 90, for creating a marking on each of the workpieces 200 loaded on the loading members 90. The driving assembly 30 is used for driving the loading members 90 to move. The positioning assembly 70 is used for positioning the loading members 90 to align with the marking mechanism 80. In the illustrated embodiment, the workpieces 200 not yet aligned with the marking mechanism 80 are not shown in FIGS. 1 and 4.

Figure 2:
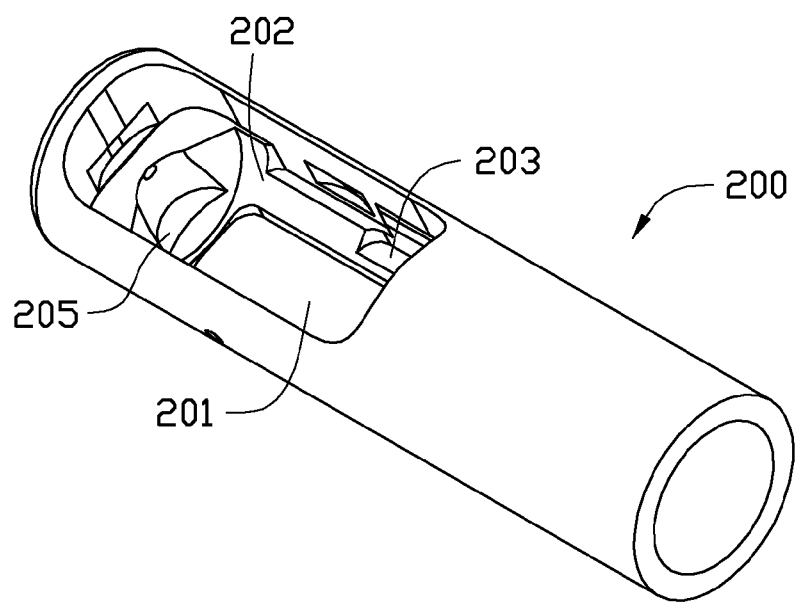
FIG. 2 is an enlarged, isometric view of one of the workpieces shown in FIG. 1.

Referring to FIG. 2, in one embodiment, each workpiece 200 is substantially a hollow cylinder, and defines an opening 202 at the sidewall of the workpiece 200 for allowing the laser beam of the marking mechanism 80 to pass through, to mark the inner sidewall of the workpiece 200. The inner sidewall of the workpiece 200 forms a resisting surface 201 facing the opening 202, a first latching portion 203 beside the resisting surface 201 and a second latching portion 205 at an end of the resisting surface 201. The resisting surface 201, the first latching portion 203, and the second latching portion 205 are substantially parallel to the opening 202.

Referring to FIG. 1 again, the supporting assembly 10 includes a supporting frame 11 and a supporting platform 13 fixed on the supporting frame 11. The supporting platform 13 is horizontally positioned.

Figure 3:
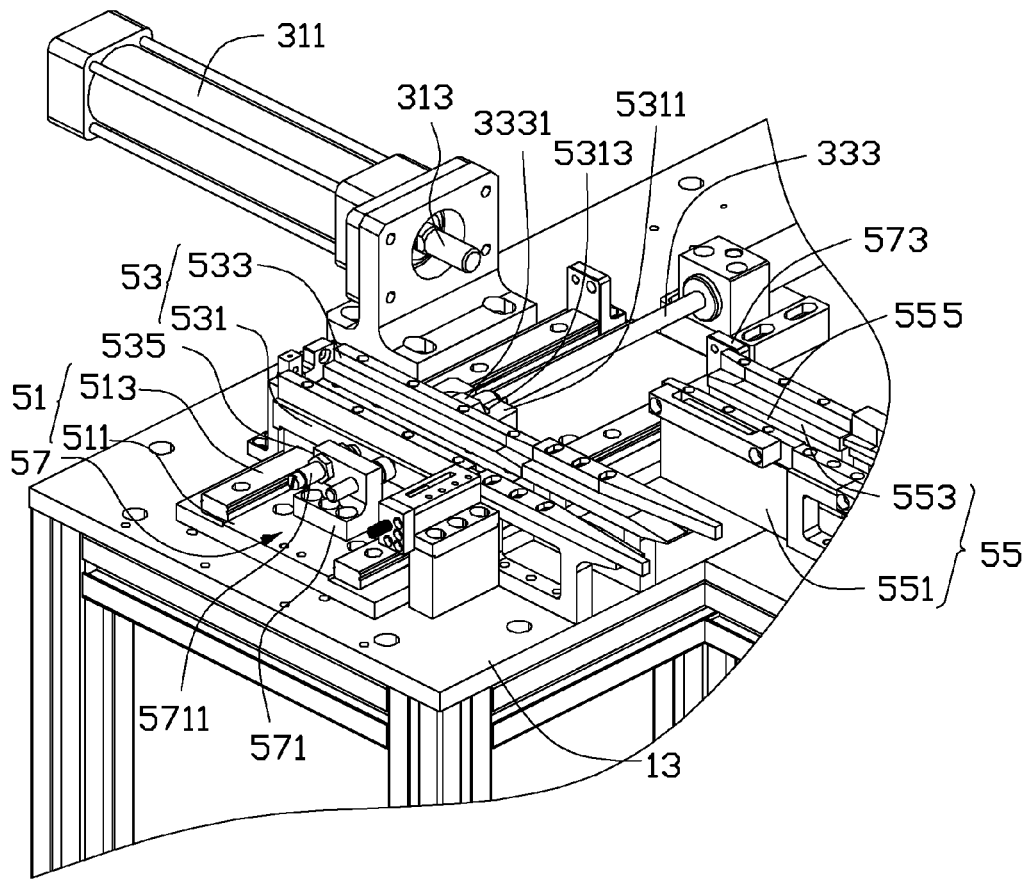
FIG. 3 is an enlarged, partial, isometric view of the marking device shown in FIG. 1 without the loading members.

Referring to FIG. 3, the driving assembly 30 includes a first driving member 31 and a second driving member 33 mounted on the supporting platform 13. The first driving member 31 is perpendicular to the second driving member 33. The first driving member 31 includes a main body 311 fixed on the supporting platform 13 and a first driving rod 313 extending out from an end of the main body 311. The second driving member 33 includes a main body 331 fixed on the supporting platform 13 and a second driving rod 333 extending out from an end of the main body 331, located near the first driving rod 313. The second driving rod 333 forms a latching portion 3331 at a distal end away from the main body 331. In the illustrated embodiment, the first driving member 31 and the second driving member 33 are a plurality of cylinders. The latching portion 3331 is a flange.

The carrying assembly 50 includes a guiding member 51, a transmitting member 53, a bearing member 55, and a position limiting member 57. The guiding member 51 includes a supporting plate 511 mounted on the supporting platform 13, and a pair of guiding rails 513 mounted on the supporting plate 511. The supporting plate 511 is located adjacent to the second driving member 33. The guiding rails 513 are perpendicular to the first driving member 31, and parallel to the second driving member 33. The second driving rod 333 is located between the pair of guiding rails 513.

The transmitting member 53 is slidably mounted on the guiding rails 513. The transmitting member 53 is substantially cuboid, and includes a base body 531 and a pair of sliding rails 533 formed at a side of the base body 531 away from the guiding rail 513. The base body 531 defines a sliding groove 535 at a side of the base body 531 opposite to the sliding rails 533, and the sliding groove 535 is located on the guiding rails 513 to allow the transmitting member 53 to slide along the guiding rail 513. The sliding rails 533 are parallel to each other, and a distance between the two sliding rails 533 is less than the width of the loading members 90, such that the sliding rails 533 can support the loading members 90. The base body 531 forms a protruding portion 5311 extending from a sidewall thereof facing towards the second driving member 33. The protruding portion 5311 defines a latching groove 5313 perpendicular to the extending direction of the protruding portion 5311. The latching portion 3331 is latched in the latching groove 5313, for driving the transmitting member 53 to slide on the guiding rail 513. In the illustrated embodiment, the latching groove 5313 passes through the protruding portion 5311.

The bearing member 55 is fixed on the supporting platform 13 perpendicularly to the second driving member 33, and aligned with the first driving member 31. The width and the height of the bearing member 55 are the same as those of the transmitting member 53. The bearing member 55 includes a main body 551, and a pair of sliding rails 553 formed at a side of the main body 551 away from the supporting platform 13. The sliding rails 553 are perpendicular to the second driving member 33, and the shape of the sliding rails 553 is the same as that of the sliding rails 533. The main body 551 defines a first through groove 555 perpendicular to the supporting platform 13 and the second driving rod 333, and is located between the two sliding rails 553, for allowing the laser beam provided by the marking mechanism 80 to pass through. The sliding rails 533 and the sliding rails 553 are essentially coplanar, for allowing the loading members 90 on the sliding rails 533 to slide to the sliding rails 553.

The position limiting member 57 includes a first limiting block 571, a pair of second limiting blocks 573, and two buffers 5711. The first limiting block 571 is mounted on an end of the supporting plate 511 away from the second driving member 33. The pair of second limiting blocks 573 are fixed on the distal end of the guiding rails 513 near to the second driving member 33. The buffers 5711 are mounted on the first limiting block 571, for providing a stoppage buffer for the transmitting member 53 sliding along the guiding rails 513. The number of the buffers 5711 can be one or more.

Figure 4:
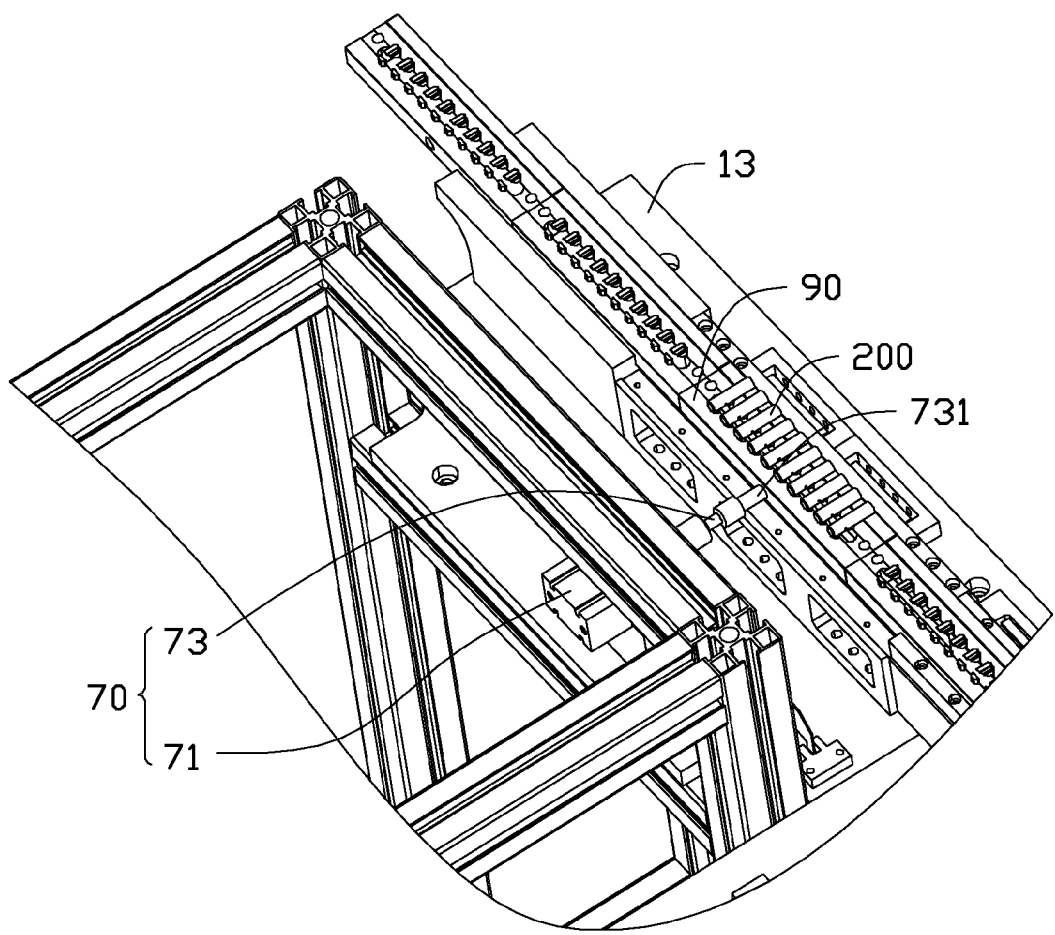
FIG. 4 is another enlarged, partial, isometric view of the marking device shown in FIG. 1.

Further referring to FIG. 4, the positioning assembly 70 is fixed on the supporting platform 13 beside and perpendicular to the bearing member 55. The positioning assembly 70 includes a driving member 71 and a driving rod 73 mounted on the driving member 71. The driving member 71 is capable of driving the driving rod 73 to extend perpendicular to the bearing member 55. The driving rod 73 forms a positioning portion 731 at a distal end thereof towards the bearing member 55. In the illustrated member, the driving member 71 is a cylinder.

Figure 5:
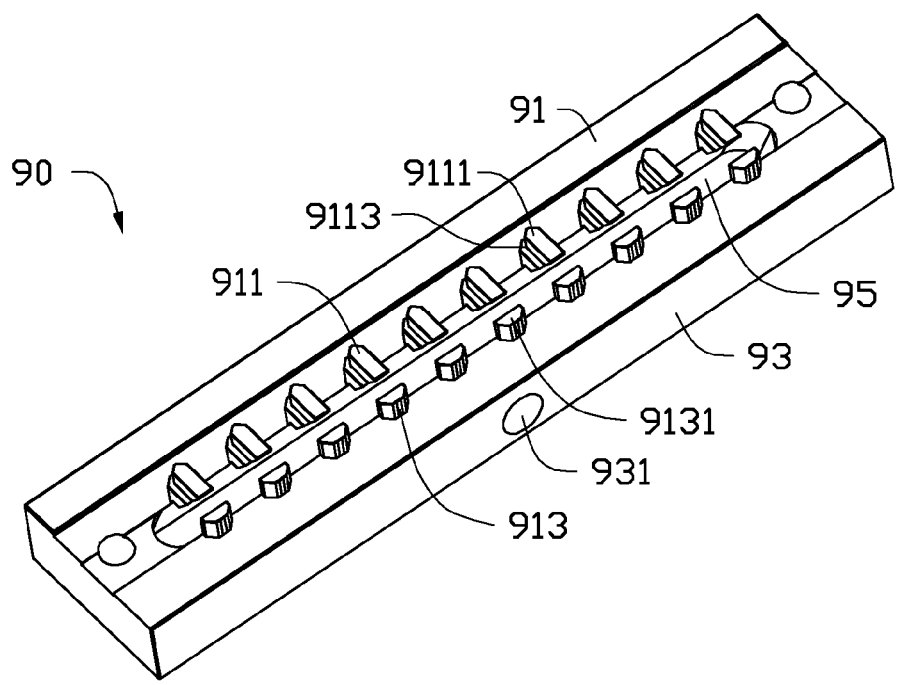
FIG. 5 is an enlarged, isometric view of one of the loading members of the marking device shown in FIG. 1.
Figure 6:
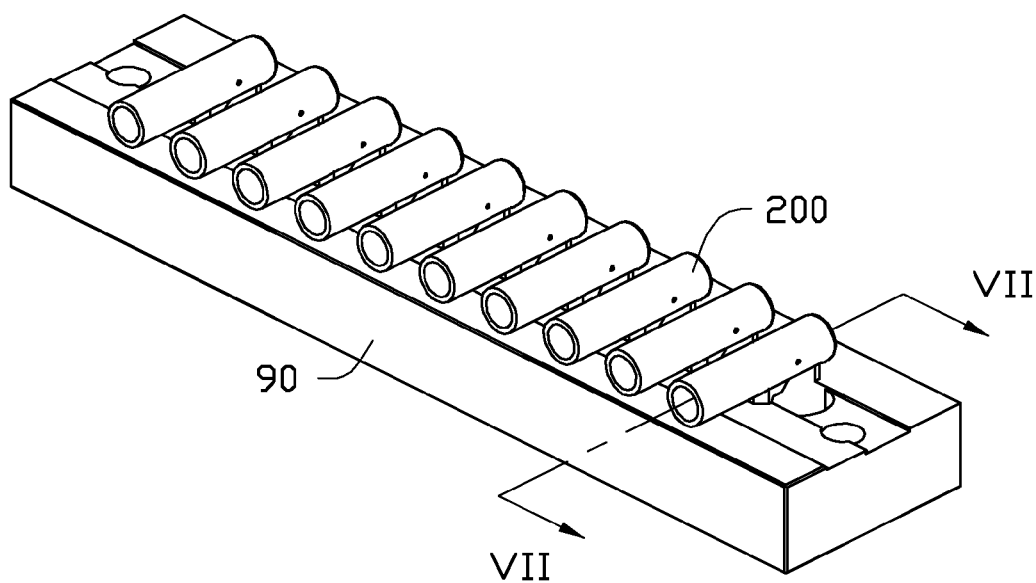
FIG. 6 is an enlarged, isometric view of one loading member carrying a plurality of workpieces for the marking device shown in FIG. 1.
Figure 7:
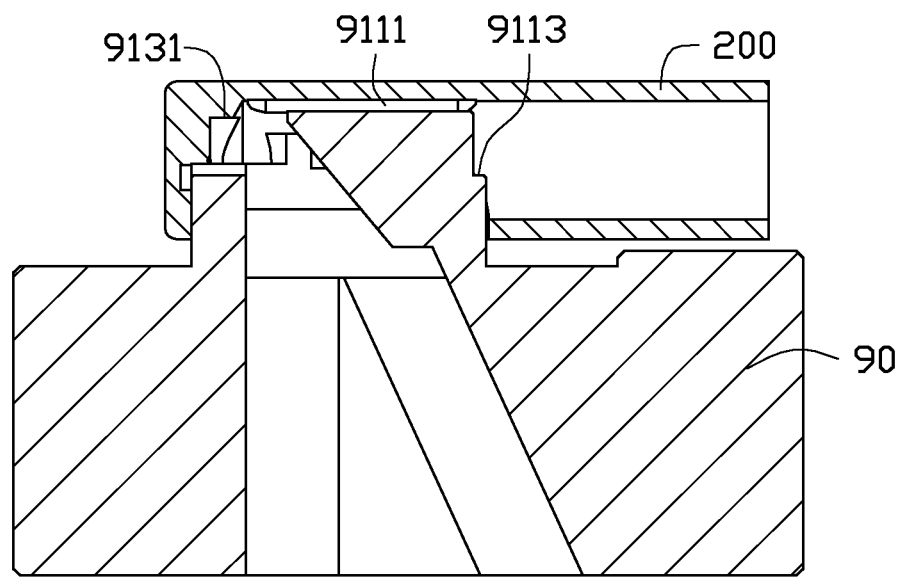
FIG. 7 is an enlarged, cross-sectional view taken along line VII-VII shown in FIG. 6.

Further referring to FIG. 5, each loading member 90 is substantially cuboid, and the length of each loading member 90 is equal to the length of the sliding rails 533. Each loading member 90 forms a bearing surface 91 and a positioning surface 93 perpendicular to the bearing surface 91. Each loading member 90 defines a second through groove 95 along the lengthwise direction thereof. The bearing surface 91 forms a plurality of first protrusions 911 which are uniformly-spaced along one side of the second through groove 95 and a corresponding plurality of second protrusions 913 which are also uniformly spaced along the opposite side of the second through groove 95. Each the first protrusion 911 is substantially an upside-down triangle, and includes an end surface 9111 away from the bearing surface 91 and a latching surface 9113 located between the end surface 9111 and the bearing surface 91. The end surface 9111 is parallel to the bearing surface 91. The latching surface 9113 is parallel to the end surface 9111 and the bearing surface 91. Each second protrusion 913 includes a end surface 9131, away from and parallel to the bearing surface 91. The positioning surface 93 defines a latching portion 931 matched with the positioning portion 731, for latching with the positioning portion 731. In the illustrated embodiment, the latching portion 931 is a latching hole.

Referring to FIGS. 1 to 7, in assembly, first, the guiding member 51 is fixed on the supporting platform 13, and the transmitting member 53 is mounted on the guiding member 51. The sliding groove 535 latches with the guiding rail 513, to make the transmitting member 53 slide along the guiding member 51. Second, the second driving member 33 is fixed on the supporting platform 13 opposite to the guiding member 51, and the second driving rod 333 is aligned with the protruding portion 5311. The latching portion 3331 latches with the latching groove 5313, for driving the transmitting member 53 to slide along the guiding member 51. Third, the first limiting block 571 is fixed on the supporting plate 511 opposite to the second driving member 33, and the second limiting blocks 573 are each fixed on the supporting platform 13 at the end of each of the guiding rails 513. The two buffers 5711 are mounted on the first limiting block 571.

Fourth, the second driving member 33 drives the transmitting member 53 to slide along the guiding member 51 until stopped by the second limiting blocks 573. At the same time, the first driving member 31 is fixed on the supporting platform 13, and aligned with the transmitting member 53. The first driving rod 313 faces the transmitting member 53. The bearing member 55 is mounted on the supporting platform 13 perpendicular to the guiding rail 513, and is aligned in a straight line with the transmitting member 53. Fifth, a plurality of the loading members 90 are placed one by one on the sliding rails 553, and the second through grooves 95 are aligned with the first through groove 555. The positioning assembly 70 is mounted on the supporting platform 13 beside the bearing member 55. The driving rod 73 is perpendicular to the bearing member 55, and the positioning portion 731 is aligned with the latching portion 931 of one of the loading members 90. In the illustrated embodiment, the positioning portion 731 is aligned with the latching portion 931 of the loading member 90 (second in line) which is next to the loading member 90 (first in line) near the transmitting member 53. The marking mechanism 80 is placed under the platform 13, and aligned with the second loading member 90. The platform 13 defines an opening (not shown) for allowing the laser beam provided by the marking mechanism 80 to pass through.

In use, the plurality of workpieces 200 are placed on the loading members 90, and the first protrusions 911 and the second protrusions 913 insert themselves into the openings 202 of the workpieces 200, to resist on the inner sidewall of the workpieces 200. The end surface 9111 resists on the resisting surface 201. The latching surface 9113 resists on the first latching portion 203. The end surface 9131 resists on the second latching portion 205. The positioning portion 731 is latched with the latching portion 931 driven by the driving member 71, for precisely positioning the loading member 90. The marking mechanism 80 emits a laser beam to make a marking on the inner sidewall of the workpieces 200. After marking of the workpiece 200, the positioning portion 731 is unlocked or disengaged from the latching portion 931 driven by the driving member 71.

Following the marking step, the second driving rod 333 pushes the transmitting member 53 to slide along the guiding rails 513 towards the first limiting block 571 driven by the second driving member 33. The buffers 5711 resist against the transmitting member 53. A loading member 90 carrying the workpieces 200 is conveyed to the sliding rails 533 by a belt conveyor (not shown). The second driving rod 333 pulls the transmitting member 53 to slide along the guiding rails 513 to align with the bearing member 55 driven by the second driving member 33. The first driving rod 313 pushes the loading member 90 on the sliding rails 533 to slide along the sliding rails 533 until the sliding rails 553 are reached. Additionally, the loading member 90 loading the marked workpieces 200 is pushed to slide along the sliding rails 553 away from the transmitting member 53, and the space which is vacated by the loading member 90 is taken by another loading member 90 that is loaded with unmarked workpieces 200. The positioning assembly 70 positions the loading member 90 loaded with unmarked workpieces 200, and the marking mechanism 80 marks each unmarked workpiece 200.

The workpieces 200 can be in a number of other shapes, and the shape of the loading members 90 changes accordingly, to accommodate and position the workpieces 200 on the loading members 90. The sliding movement of the transmitting member 53, relative to the supporting platform 13, can be achieved by other means, such as, for example, having the transmitting member 53 rolling on the supporting platform 13 via a plurality of rollers. The second driving member 33 can act upon the transmitting member 53 by other means, such as the second driving rod 333 integrating with the base body 531.

Synchronously with the marking of each workpiece 200, the transmitting member 53 is pulled by the second driving member 33 to align with the bearing member 55 in a straight line, and the first driving member 31 pushes the loading member 90 loaded with unmarked workpieces 200 to slide to the sliding rails 553. The loading member 90 loaded with unmarked workpieces 200 takes the place of the loading member 90 carrying the workpieces 200 which have been marked. The marking device 100 achieves automatic transport and presentation of the workpieces 200 throughout the laser marking process, and a significant amount of manpower is saved. Furthermore, the transportation and marking of the workpieces 200 are performed virtually simultaneously, so that the marking device 100 carries out its function very efficiently. The positioning assembly 70 is inherently precise in its positioning of the loading members 90, so that the markings are correspondingly precise.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A marking device, used for making a marking on one or more workpieces, comprising:
    a supporting assembly;
    a marking mechanism emitting a laser beam to mark the workpiece;
    a carrying assembly comprising:
        a transmitting member slidably mounted on the supporting assembly,
        a guiding member fixed on the supporting assembly, the guiding member comprising a pair of guiding rails, for guiding the transmitting member sliding along the guiding rails, and
        a bearing member mounted on the supporting assembly opposite to the marking mechanism;
    a driving assembly mounted on the supporting assembly; and
    a plurality of loading members, for carrying the one or more workpieces for marking;
        wherein the loading members are placed on the transmitting member and the bearing member;
the driving assembly is capable of driving the transmitting member to align with the bearing member in a straight line, and then driving the loading member on the transmitting member to move to the bearing member.

2. The marking device of claim 1, wherein the bearing member defines a first through groove; each loading member defines a second through groove; the first through groove of the bearing member is aligned with the second through groove of the loading member, for allowing the laser emitted by the marking mechanism to pass through.

3. The marking device of claim 1, wherein the guiding assembly further comprises a supporting plate mounted on the supporting assembly; the guiding rails are mounted on the supporting plate; the carrying assembly further comprises a position limiting member; the position limiting member comprises a first limiting block mounted on the supporting plate, a pair of second limiting blocks mounted on the supporting assembly, and at least one buffer mounted on the first limiting block.

4. The marking device of claim 1, wherein the transmitting member and the bearing member both form a pair of sliding rails at the side away from the supporting assembly; the loading member is capable of sliding along the sliding rails of the transmitting member and the sliding rails of the bearing member.

5. The marking device of claim 1, wherein the marking device further comprises a positioning assembly mounted on the supporting assembly besides the bearing member; the positioning assembly comprises a driving member and a driving rod mounted on the driving member; the driving rod is perpendicular to the bearing assembly, and is capable of being driven by the driving member to extend.

6. The marking device of claim 2, wherein the driving rod forms a positioning portion; the loading member defines a latching portion matched with the positioning portion; the positioning portion is capable of latching with the latching portion when driven by the driving member, for positioning the loading member.

7. The marking device of claim 1, wherein the driving assembly comprises a first driving member and a second driving member perpendicular to the first driving member; the first driving member is aligned with the bearing member, for driving the loading member on the transmitting member to move to the bearing member; the second driving member is connected to the transmitting member, for driving the transmitting member to align with the bearing member in a straight line.

8. The marking device of claim 7, wherein the first driving member comprises a first driving rod, for pushing the loading member on the transmitting member to move to the bearing member; the second driving member comprises a second driving rod; the second driving rod forms a latching portion at a distal end thereof; the transmitting member defines a latching groove at the side towards the second driving rod; the latching portion latches with the latching groove.

9. The marking device of claim 1, wherein the loading member forms a plurality of protrusions for latching with the workpieces.

10. A marking device, used for making a marking on one or more workpieces, comprising:
    a supporting assembly comprising a supporting frame and a supporting platform fixed on the supporting frame;
    a marking mechanism emitting a laser beam to mark the one or more workpieces;
    a carrying assembly comprising a transmitting member slidably mounted on the supporting platform, and a bearing member mounted on the supporting platform opposite to the marking mechanism;
    a driving assembly mounted on the supporting platform;
    a positioning assembly mounted on the supporting platform; and
    a plurality of loading members, for carrying the one or more workpieces for marking;
        wherein the loading members loading one or more unmarked workpieces are placed on the transmitting member and the bearing member; the positioning member is capable of positioning the loading member loading the workpieces being marked; the driving assembly is capable of driving the transmitting member to align with the bearing member in a straight line, and then driving the loading member on the transmitting member to move to the bearing member, and the loading member loading unmarked workpieces takes the place of the loading member carrying marked workpieces.

11. The marking device of claim 10, wherein the bearing member defines a first through groove; each loading member defines a second through groove; the first through groove of the bearing member is aligned with the second through groove of the loading member, for allowing the laser beam emitted by the marking mechanism to pass through.

12. The marking device of claim 10, wherein the carrying assembly further comprises a guiding member fixed on the supporting platform; the guiding member comprises a pair of guiding rails, for guiding the transmitting member sliding along the guiding rails.

13. The marking device of claim 12, wherein the guiding assembly further comprising a supporting plate mounted on the supporting platform; the guiding rails are mounted on the supporting plate; the carrying assembly further comprises a position limiting member; the position limiting member comprises a first limiting block mounted on the supporting plate, a pair of second limiting blocks mounted on the supporting platform, and a buffer mounted on the first limiting block.

14. The marking device of claim 10, wherein the transmitting member and the bearing member both form a pair of sliding rails at the side away from the supporting platform; the loading member is capable of sliding along the sliding rails of the transmitting member and the sliding rails of the bearing member.

15. The marking device of claim 10, wherein the positioning assembly mounted on the supporting platform besides the bearing member; the positioning assembly comprises a driving member and a driving rod mounted on the driving member; the driving rod is perpendicular to the bearing assembly, and is capable of being driven by the driving member to extend.

16. The marking device of claim 15, wherein the driving rod forms a positioning portion; the loading member defines a latching portion matched with the positioning portion; the positioning portion is capable of latching with the latching portion when driven by the driving member, for positioning the loading member.

17. The marking device of claim 10, wherein the driving assembly comprises a first driving member and a second driving member perpendicular to the first driving member; the first driving member is aligned with the bearing member, for driving the loading member on the transmitting member to move to the bearing member; the second driving member is connected to the transmitting member, for driving the transmitting member to align with the bearing member in a straight line.

18. The marking device of claim 17, wherein the first driving member comprises a first driving rod, for pushing the loading member on the transmitting member to move to the bearing member; the second driving member comprises a second driving rod; the second driving rod forms a latching portion at a distal end thereof; the transmitting member defines a latching groove at the side towards the second driving rod; the latching portion latches with the latching groove.

19. The marking device of claim 10, wherein the loading member forms a plurality of protrusions for latching with the one or more workpieces.

* * * * *